United States Patent Office 3,770,690
Patented Nov. 6, 1973

3,770,690
PRE-FABRICATED GEL COATS
Stanley Oswitch, University Heights, and Kevin K. Kipp, Cleveland Heights, Ohio, assignors to Ferro Corporation, Cleveland, Ohio
No Drawing. Continuation of abandoned application Ser. No. 43,213, June 3, 1970. This application Nov. 17, 1971, Ser. No. 199,752
Int. Cl. C08g 43/02, 51/04
U.S. Cl. 260—37 EP    7 Claims

ABSTRACT OF THE DISCLOSURE

The pre-fabricated gel coating disclosed herein is easily handled, is in dry sheet form and can be preshaped and press molded. It comprises a layer of a uniform thickness of resin gel reinforced by a fiber mat such as polyethylene polyterephthalate fiber. The resin gel comprises an epoxy resin or an unsaturated polyester alkyd resin with fumed alumina filler. This pre-fabricated gel coating can be preshaped to fit molds having a moderate degree of configuration and thereafter molded simultaneously with the molding resin. This avoids the messiness and non-uniform thickness resulting from brushing or spray coating molds prior to molding. It also reduces the time required for the total molding operation.

BACKGROUND OF THE INVENTION

Field of the invention

This is a continuation of application, Ser. No. 43,213, filed June 3, 1970, now abandoned.

This invention relates to a pre-fabricated gel coating in dry sheet form that is easily handled and can be preshaped to fit a mold. More specifically, it relates to a composite article comprising a uniform layer of resin gel reinforced by a layer of resin fiber.

Related prior art

It is common practice in molding compositions of fiberglass and resin to provide an exterior layer of resin to give a smooth exterior surface to the molded product. This is effected by spraying or brushing a liquid gel-coating onto the interior surface of the mold which is to be used. After the mold is thus coated, the molding composition is introduced into the mold, and the necessary heat and pressure applied to complete the molding.

The application of a gel coating by either spraying or brushing is a messy procedure and results in uneven coatings, in some areas the coating may be too thin and in other areas thicker than necessary. It is also a time consuming step causing a slower rate of production.

SUMMARY OF THE INVENTION

In accordance with the present invention it has now been found that a gel coating can be pre-fabricated in a dry sheet form that can be easily handled and easily preformed to fit the interior of a mold and thereafter molded and fused simultaneously with the main body of molding resin introduced into the mold. This dry, pre-fabricated sheet generally has an overall thickness of 10-20 mils, with 6-16 mils comprising resinous gel material in the form of a B-stage resin containing 10-25 parts of fumed alumina per 100 parts of resin, and about 4 mils of substrate reinforcement, such as polyester fiber. The resin gel is either an epoxy resin or an unsaturated polyester alkyd resin, such as derived from the anhydride of a dibasic acid, at least a portion of the anhydride being an unsaturated anhydride such as maleic anhydride, fumaric anhydride, by reaction with diethylene glycol, ethylene glycol, 1,4-cyclohexane-dimethanol, etc., and generally eventually crosslinked with diallylphthalate. A portion of the anhydride used in preparing the resin may be free of aliphatic unsaturation, such as phthalic anhydride, tetrabromophthalic anhydride, endic anhydride, etc. The resin is in a flowable form when applied initially, and after spreading to a film form is advanced by heating to a B-stage resin.

The film is kept in a flexible, easily handled condition for shaping and applying to the interior of a mold by limiting the heating to 5–25 minutes at about 115–125° C., preferably 20 minutes at 120° C. for epoxies, 5 minutes at 120° C. for polyesters. Further heating makes the film more rigid and harder to handle for this purpose.

This sheet may be prepared by warming a gel coat material to a semi-fluid state or by dissolving the same in a solvent and applying a uniform layer of the same to a release paper by means of a gaged applicator. This coating is then backed up or covered with a reinforcing fiber, web or woven material, the solvent evaporated, and the resin brought to a B-stage in a heating oven. The time and temperature of the B-stage heating is dependent upon the particular resin system used.

In a preferred system a solution of the resin is dissolved in an appropriate solvent and cast as a film on a release paper by means of a gaged draw bar. The film is heated in an oven to remove the solvent. Then, as previously described, the reinforcing layer is placed thereon. The reinforcing fiber can be either unimpregnated or pre-impregnated with a solution of the base resin system used in the gel coating with the solvent removed during the heating period. Light pressure may be applied on the reinforcing layer by passing the combined layers through a set of rollers.

The availability and use of such dry, pre-fabricated gel coating has a number of advantages, including controlled, uniform thickness of gel coat, cleaner and less wasteful operation, more ease and speed in handling, improved coverage of underlaying fiber pattern, reduced tendency for laminate warping, reduced tendency for gel coat crazing, blistering, cracking, sagging, sissing, and color variation, and the easy incorporation of materials to give special properties such as abrasion resistance, conductivity, etc., in the gel coat.

A particularly suitable resin for the purpose of this invention is prepared by reacting an epoxy resin having a molecular weight in the range of 350–950 and an epoxy equivalent in the range of 150–550 with a poly-aliphatic-dibasic acid polyanhydride having at least four anhydride repeating units in a linear polymer chain. Fumed alumina is used as filler. Advantageously a curing agent or accelerator is also used, such as a tertiary amine or a stannous alkanoate of 5–12 carbon atoms, e.g. benzyldimethylamine, (dimethylaminomethyl)phenol, stannous octoate, etc. The product can be cast as a film or layer by warming the composition to about 50° C. to give flow properties, or a solvent may be used and the resultant solution applied.

The epoxy resin and polyanhydride can be mixed by heating to 100° C. at which temperature the ingredients are easily stirred, and the resultant hot melt is mixed with the fumed alumina filler, and the accelerator, such as benzyldimethylamine. Without the fumed alumina the composition is not satisfactory for the purpose of this invention. Once the accelerator is added, it is advantageous to apply the composition to avoid premature gelation, although there is no noticeable increase in viscosity in four hours and gelation does not occur in less than 16 hours. If the composition is not to be used within a few hours, the accelerator should be withheld until the appropriate time.

Tertiary amines are suitable as accelerators for the epoxy resin compositions of this invention, preferably, those having no more than 18 carbon atoms. Particularly preferred are benzyldimethylamine, (dimethylaminomethyl)phenol, tris(dimethylaminomethyl)phenol, dimethylaniline and pyridine. Also satisfactory are tributylamine, triamylamine, dimethylbutylamine, dimethylnaphthylamine, diethyltolylamine and the like. While tertiary amines are preferred, stannous alkanoates of 5–12 carbon atoms can also be used, such as the octoate, caproate, heptoate, decoate and dodecoate.

Based on 100 parts of epoxy resin, the various components are used in proportions of 50–58 parts, preferably 65–70 parts of polyanhydride; 10–25, preferably 14–19 parts of fumed alumina; and 0.5–5 parts of accelerator, preferably 0.6–0.8, particularly when the preferred tertiary aromatic or benzyl amines are used.

Advantageously the epoxy resin is fluid without diluttion. However, if the particular epoxy resin used is solid at room temperature, it is advantageously melted by heating to 70–80° C., or a solvent may be used, particularly if the resultant composition is to be applied as a solution. The polyanhydride is generally soild at room temperature, and is advantageously melted by heating to 70–80° C., or

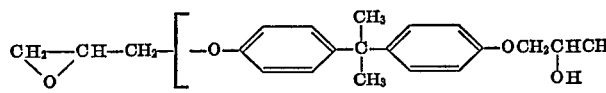

is dissolved in a solvent such as xylene, toluene, acetone or other ketone or mixture thereof.

Solvents suitable for dissolving the resultant resin reaction product include various hydrocarbons such as xylene, toluene, and the like. Also suitable are chlorinated hydrocarbons such as dichloroethylene, trichloroethylene, chlorobenzene, etc.; ketones such as acetone, methylethylketone; alcohols such as ethanol, propanol, butanol and the like.

The fumed alumina filler is preferably added in an amount of 6–12 parts per 100 parts of combined resin components. Fumed alumina is a commercial available alumina of extremely small particle size having diameters of less than 1 micron, preferably less than 0.5 micron. This is predominantly of the gamma crystalline form and is produced by the hydrolysis of $AlCl_3$ in a flame process to approximately 99% alumina with a specific gravity of about 3.6 and a refractive index of 1.7. A preferred particle size of fumed alumina has an average particle diameter of about 0.03 micron.

The epoxy resin is a polymeric reaction product of epichlorohydrin or a corresponding butyl compound with a dihydroxy phenol, such as bisphenol, resorcinol, hydroquinone, dihydroxydiphenyl dihydroxydiphenylmethane, and also of novolac resins such as linear-formaldehyde-cresol resins which have been etherified with epichlorohydrin or a corresponding butyl compound to give glycidyl or epoxy butyl ether derivatives. The epoxy resin can comprise the straight resin or the resin is dissolved in the monomeric epoxy compound such as diglycidyl-bisphenol.

A typical epoxy resin is illustrated by the following formula for a polymer of the diglycidyl bisphenol type:

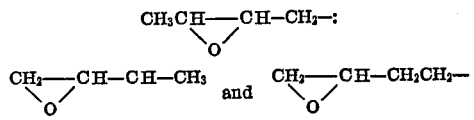

When the value for $n$ in the formula is 0, the formula represents the monomeric diglycidyl ether of bisphenol. With $n$ having a value of 1, the formula represents the dimer which has a molecular weight of 634. When $n$ has a value of 2, the formula represents the trimer which has a molecular weight of 918 and a melting point of about 65–75° C.

The respective epoxybutyl groups are represented by the formulas

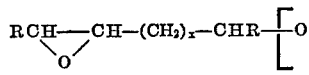

The corresponding epoxy butyl ethers are prepared by using

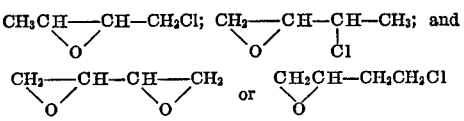

in place of epichlorohydrin to react with the dihydric phenols, such as bisphenol, dihyroxydiphenyl, dihydroxydiphenylmethane, resorcinol and hydroquinone, or with the novalac resin. These epoxybutyl and glycidyl radicals are represented by the formula

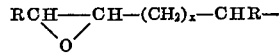

wherein $x=0$ or 1, R is hydrogen or methyl, with no more than one R representing methyl and when $x=1$, both R's represent hydrogen.

The epoxy resins of the dihydric phenols are represented by the following formula:

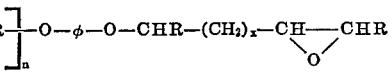

wherein $\phi$ represents the divalent radical derived by the removal of the hydroxy groups from the respective dihydric phenols, and the other symbols have the definitions given above.

The novolac based epoxy resins are represented by the formula

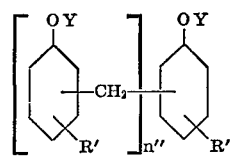

wherein Y is hydrogen or an epoxy radical of the formula

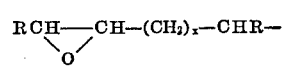

as defined above, there being at least three of said epoxy radicals per polymer molecule, and R' represents hydrogen or an alkyl group of 1–5 carbon atoms. The initial novolac resin is prepared by the reaction of formaldehyde with a phenol such as phenol, cresol, ethylphenol, propylphenol, butylphenol, amylphenol and the like to give a linear polymer having at least four phenolic repeating units. The procedures for preparing such novalaces are well known in the art. These novolacs are then reacted, preferably under basic conditions such as in the presence of NaOH, with epichlorohydrin or an epoxybutyl compound as described above to give a polymer derivative of the above formula.

The polyanhydrides of dibasic acids suitable for the practice of this invention are represented by the formula

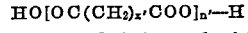

wherein $x'$ has a value of 5–10 and $n'$ has a value of at least 4, preferably at least 10 and need not exceed 20. Suitable polyanhydrides include those of pimelic, suberic, azelaic, sebacic, nonanedioic and decanedioic acids. Particularly preferred are polyazelaic polyanhydrides having a molecular weight in the range of 1500–3000.

The preferred polyanhydride is polyazelaic polyanhydride having at least 10 repeating units. In addition to the polyazelaic polyanhydride, the polyanhydrides of other dibasic acids having 5–10 methylene groups between the two carboxylic acids also can be used, advantageously having at least 4 repeating units, preferably at least 10 in the polymeric linear chain.

The unsaturated alkyd resins that are suitable for the practice of this invention have a molecular weight in the range of 800 to 3000 and an acid number of 10–40. These comprise polyesters derived from an unsaturated dibasic acid, or its anhydride, by reaction with a dihydric alcohol or glycol. Typical unsaturated anhydrides or acids are maleic, fumaric, methylmaleic, citraconic, etc., and typical glycols are ethylene glycol, propylene glycol, butylene glycol, diethylene glycol, triethylene glycol, 1,4-cyclohexanedimethanol, hydrogenated bisphenol A, etc. The unsaturated dibasic acid may be replaced partially by dibasic anhydrides or acids not having reactive ethylenic unsaturation therein such as phthalic anhydride, adipic anhydride, endic anhydride (endomethylenetetrahydrophthalic anhydride), tetrabromophthalic anhydride, etc. Advantageously at least 30 percent, and preferably at least 50 percent of the anhydride is maleic or other unsaturated anhydride. The methods of preparation of the resins are well known in the art and many types are available commercially.

Normally a crosslinking monomer is present in the alkyd composition such as diallylphthalate, p-butylstyrene, diacetone acrylamide, etc. While as much as 30 percent of such monomer may be used, generally less than 20 percent is preferred. The monomer serves also as diluent or softening agent. For the purpose of this invention the less volatile monomers or solid monomers are preferred since they are less likely to escape if the linear is to be stored for long periods. Pigments and fillers may also be incorporated if desired.

Various methods of practicing the invention are illustrated by the following examples. These examples are intended merely to illustrate the invention and not in any sense to limit the scope or the manner in which the invention can be practiced. The parts and percentages recited therein and all through the specification, unless specifically provided otherwise, are by weight.

EXAMPLE I

A resin composition is prepared using 100 parts of a diglycidyl bisphenol. A liquid resin having an average molecular weight of 900, an epoxide equivalent of 500, a viscosity of 1.4 poises at 25° C., and an equivalent weight of about 145 (grams of resin to esterify one mole of acid). This comprises a major part of diglycidyl bisphenol trimer and approximately 5% of the corresponding dimeric compound. To this is added 70 parts of polyazelaic polyanhydride having an average molecular weight of 2300. These materials are heated to about 100° C. and mixed with stirring to obtain uniform mixture. Then to this hot blend are added and mixed 15 parts of fumed alumina and 0.6 part of benzyldimethylamine. This mixture has a pot life of more than 16 hours with no apparent change in viscosity occuring within 4 hours. A film is drawn from the resultant blend maintained at 50° C. to give a thickness of 10–20 mils and reinforced with a polyester veil material.

In preparing the film, the material is applied to a sheet of "Mylar" release film by a 6" doctor blade mounted between two guides and adjustable to give from 10 to 20 mils thickness. After the desired thickness is cast, it is gelled for 20 minutes at 125° C., a polyester fiber ("Pellon") reinforcing layer is then placed on top of the resin. This film is used to line the inner surface of a mold. Then the mold is filled with a fiberglass impregnated epoxy resin and molded at a temperature of 120–150° C. for 30 minutes. A very smooth molded surface is obtained with the outer film being integrally molded to the main part of the molded product.

EXAMPLE II

The procedure of Example I is repeated except that the resin composition is prepared in a solution by adding a solvent comprising 50–50 percent by weight mixture of acetone and xylene to give a solution containing 75% solids. The solution is cast and the solvent evaporated to give a film. This is treated as in Example I before being used to line a mold. Similar results are obtained as in Example I upon molding.

EXAMPLE III

The procedure of Example I is repeated a number of times with similar results using in place of the polyazelaic polyanhydride an equivalent weight of polysebacic polyanhydride with a corresponding molecular weight.

EXAMPLE IV

The procedure of Example I is repeated three times with similar results using individually in place of the diglycidyl bisphenol resin equivalent weights respectively of (a) A resin prepared from

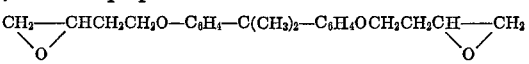

having an epoxy equivalent of approximately 195 and an average molecular weight of about 400;

(b) A resin prepared from

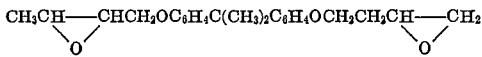

having an epoxy equivalent of approximately 240 and an average molecular weight of 510; and (c) A resin prepared from

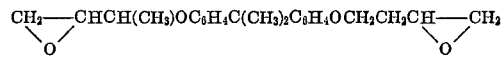

having an epoxy equivalent of approximately about 350 and an average molecular weight of about 600.

In each case the compositions are drawn to films, processed and used to line molds before filling and molding as in Example I.

EXAMPLE V

Similar results are obtained when equivalent weights respectively of the corresponding polyanhydrides of polypimelic, polysuberic and polydecanedioic acids are individually substituted for the polyazelaic in the procedure of Example I.

EXAMPLE VI

Similar results are obtained when an equivalent amount of an epoxy resin derived from a novolac is used having an epoxy equivalent of about 190 and an average molecular weight of about 400 in the procedure of Example I.

EXAMPLE VII

The procedure of Example I is repeated a number of times with similar results using individually in place of the benzyldimethylamine equivalent amounts respectively of (dimethylaminomethyl)phenol, tris(dimethylaminomethyl)phenol, dimethylaniline and pyridine. In each case good results are obtained in the pre-fabricated gel coating and its application and curing in a mold.

EXAMPLE VIII

The procedure of Example I is repeated using as the resin composition a mixture of 80 parts hydrogenated bisphenol A-fumarate resin, 10 parts of diallylphthalate, 10 parts of n-2-methyl-4-oxopentyl acrylamide (diacetone acrylamide), 15 parts of fumed alumina, 1 part t-butylperbenzoate and 40 parts of solvent comprising a 1:1:1:1 mixture of methylethylketone, toluene, xylene and mineral spirits. The bisphenol-fumarate resin has a molecular weight of about 2000 and an acid number of 22. The resultant film is heated five minutes at 120° C. After molding as a liner in the manner described in Example I using as the base resin in the mold the same resin used in making the liner, a smooth surfaced molded product is obtained with the liner surface well adhered to the main body of the molding.

EXAMPLE IX

The procedure of Example VIII is repeated with similar satisfactory results using as the resin a maleic anhydride-ethylene glycol resin having a molecular weight of about 2400 and an acid number of 25.

EXAMPLE X

The procedure of Example IX is repeated with similar satisfactory results using as the resin an alkyd resin prepared from 1 mole of fumaric acid, 1 mole of endic anhydride and 2 moles of 1,4-cyclohexanedimethanol with an acid number of 30 and a molecular weight of about 3,000.

EXAMPLE XI

The procedure of Example IX is repeated with similar satisfactory results using as the resin one prepared from 1.4 moles of maleic anhydride, 1 mole of tetrabromophthalic anhydride and 2.4 moles of propylene glycol, with a molecular weight of 3500 and an acid number of 20.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A non-liquid, storable, thermoplastic prefabricated gel coating for covering a molded resin product, comprising a dry, flexible sheet of a curable, partially cured, resin gel reinforced with a thermoplastic, resinous fiber mat and adapted to be subsequently shaped for lining the inside of a mold and finally cured simultaneously with the setting of resin in said mold to form said resin product, the sheet comprising an epoxy resin composition comprising:

|   | Parts by weight |
|---|---|
| Epoxy resin | 100 |
| Polydibasic acid polyanhydride | 50–85 |
| Fumed alumina | 10–25 |
| Accelerator | 0.5–5 | the epoxy resin being represented by a formula selected from the class consisting of (A)

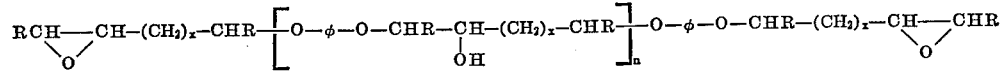

and (B)

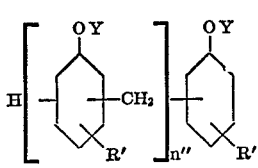

wherein $x$ represents 0 or 1;
$n$ has an average value of at least 0.5;
R is hydrogen or methyl, with no more than one R representing methyl, and when $x=1$, both R's represent hydrogen;

$\phi$ is the divalent aromatic radical derived from bisphenol, dihydroxydiphenyl, dihydroxydiphenylmethane, resorcinol and hydroquinone by removal of the hydroxy groups therefrom;
R' is hydrogen or an alkyl radical of 1–5 carbon atoms;
$n''$ represents an integer having a value of at least 4; and
$y$ represents hydrogen or an epoxyalkyl radical of the formula

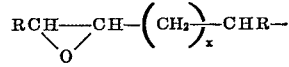

there being at least three of said epoxyalkyl radicals per polymer molecule;

the polydibasic acid polyanhydride being represented by the formula:

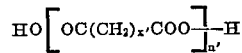

wherein $x'$ is an integer having a value of 5 to 10; and
$n'$ is an integer having a value of at least 4; and said accelerator is selected from the class consisting of tertiary amines and stannous alkanoates having 5–12 carbon atoms.

2. The gel coating of claim 1 which comprises an epoxy resin and contains per 100 parts of epoxy resin:

65–70 parts by weight of said polyanhydride;
15–19 parts by weight of fumed alumina; and
0.5–2 parts by weight of a tertiary amine.

3. The gel coating of claim 1 in which said accelerator is a tertiary amine.

4. The gel coating of claim 1 in which said epoxy resin is one having the Formula A.

5. The gel coating of claim 4 in which said polyanhydride is polyazelaic polyanhydride having for $n'$ a value of 10–20.

6. The gel coating of claim 5 in which said epoxy resin is a resin of the diglycidyl ether of hydrogenated bisphenol A.

7. The gel coating of claim 5 in which said accelerator is a tertiary amine.

References Cited
UNITED STATES PATENTS
3,475,265  10/1969  Santry _____ 264—338
3,215,763  11/1965  Buerger _____ 264—338

OTHER REFERENCES
Handbook of Epoxy Resins, Lee & Neville, McGraw-Hill Book Co., 1967, pp. 14–21 (one page) relied upon.
Plastics Technology, March 1964, pp. 37–40 relied upon.

ALLAN LIEBERMAN, Primary Examiner
S. L. FOX, Assistant Examiner

U.S. Cl. X.R.
260—830; 264—338